US012628933B2

(12) United States Patent
Hall et al.

(10) Patent No.: US 12,628,933 B2
(45) Date of Patent: May 19, 2026

(54) RECOMMENDING A FOUNDATION PRODUCT FROM AN IMAGE

(71) Applicant: The Hut.com Limited, Altrincham (GB)

(72) Inventors: Shaun Anthony Hall, Altrincham (GB); Philip Garrett Wilson, Altrincham (GB); Emilian Simion, Altrincham (GB)

(73) Assignee: The Hut.com Limited, Altrincham (GB)

( * ) Notice: Subject to any disclaimer, the term of this patent is extended or adjusted under 35 U.S.C. 154(b) by 821 days.

(21) Appl. No.: 17/910,772

(22) PCT Filed: Mar. 12, 2021

(86) PCT No.: PCT/GB2021/050635
§ 371 (c)(1),
(2) Date: Sep. 9, 2022

(87) PCT Pub. No.: WO2021/181120
PCT Pub. Date: Sep. 16, 2021

(65) Prior Publication Data
US 2023/0110913 A1    Apr. 13, 2023

(30) Foreign Application Priority Data
Mar. 12, 2020    (GB) ..................................... 2003629

(51) Int. Cl.
*G06K 9/30*        (2006.01)
*A45D 44/00*       (2006.01)
(Continued)

(52) U.S. Cl.
CPC .............. *A45D 44/005* (2013.01); *G06T 7/90* (2017.01); *G06V 10/761* (2022.01);
(Continued)

(58) Field of Classification Search
CPC ............. G06T 7/90; G06T 2207/10024; G06T 2207/30201; G06V 10/761; G06V 10/762; H04N 1/6077; A61Q 19/00; A61Q 1/02; A61K 8/00; A45D 44/005; A45D 2044/007
See application file for complete search history.

(56) References Cited

U.S. PATENT DOCUMENTS

2014/0323873 A1    10/2014    Cummins et al.
2020/0056943 A1*    2/2020    Douglas-Sydnor ..... G01J 3/526

FOREIGN PATENT DOCUMENTS

CN        110570476 A    12/2019
WO    WO 2008/108760 A1    9/2008
(Continued)

OTHER PUBLICATIONS

British Office Action dated Dec. 15, 2023, in connection with British Application No. GB2003629.9.
(Continued)

*Primary Examiner* — Duy M Dang
(74) *Attorney, Agent, or Firm* — Wolf, Greenfield & Sacks, P.C.

(57) ABSTRACT
The application relates to a method, an electronic device and a program for recommending a foundation product from.

20 Claims, 8 Drawing Sheets

(51) Int. Cl.
G06T 7/90 (2017.01)
G06V 10/74 (2022.01)
G06V 10/762 (2022.01)
H04N 1/60 (2006.01)

(52) U.S. Cl.
CPC ......... G06V 10/762 (2022.01); H04N 1/6077 (2013.01); *A45D 2044/007* (2013.01); *G06T 2207/10024* (2013.01); *G06T 2207/30201* (2013.01)

(56) References Cited

FOREIGN PATENT DOCUMENTS

| | | | |
|---|---|---|---|
| WO | WO 2015/126361 | A1 | 8/2015 |
| WO | WO 2019/010134 | A1 | 1/2019 |

OTHER PUBLICATIONS

Combined Search and Examination Report mailed Nov. 26, 2020, in connection with British Application No. GB2003629.9.
International Search Report dated Oct. 6, 2021, in connection with International Application No. PCT/GB2021/050635.
Yoon et al., Automatic Skin Pixel Selection and Skin Color Classification. IEEE. 2006. 941-944.

* cited by examiner

200

Obtain Image Data — 202

Correct Colour Balance — 204

Obtain Facial Image Data — 206

Select Facial Region Data — 207

Identify Colour Distribution in Facial Image Data — 208

Weight Facial Colour Values — 209

Generate Skin Tone Colour Profile — 210

300

Obtain Image Data — 202

Correct Colour Balance — 204

Obtain Facial Image Data — 206

Select Facial Region Data — 207

Identify Colour Distribution in Facial Image Data — 208

Weight Facial Colour Values — 209

Generate Skin Tone Colour Profile — 210

Select Complementary Product — 212

708

710

712

714

716

808 — Colour Balance Correction Instructions

810 — Facial Image Data Obtaining Instructions

812 — Facial Image Data Selecting Instructions

814 — Facial Image Data Analysing Instructions

816 — Colour Value Weighting Instructions

818 — User Skin Tone Profile Generating Instructions

Memory 806

Input 702

Processor 704

800

RECOMMENDING A FOUNDATION PRODUCT FROM AN IMAGE

CROSS REFERENCE TO RELATED APPLICATIONS

This Application is a national stage filing under 35 U.S.C. 371 of International Patent Application Serial No. PCT/GB2021/050635, filed Mar. 12, 2021, entitled "RECOMMENDING A FOUNDATION PRODUCT FROM AN IMAGE". Foreign priority benefits are claimed under 35 U.S.C. § 119(a)-(d) or 35 U.S.C. § 365(b) of British application number 2003629.9, filed Mar. 12, 2020. The entire contents of these applications are incorporated herein by reference in their entirety.

BACKGROUND

Online shopping has become increasingly popular in recent years. It is convenient to retailers as their market is not limited to those who can access the relevant shops. It is convenient to the user as they can shop from the comfort of their home and can access a wider range of retailers than may be available to them in their locale. However, for some types of purchases such as those requiring accurate colour matching, for example, clothes, furnishings and make-up products such as foundations, online shopping has some disadvantages. At times, the depiction provided of such items in the online retail environment is not representative of their real shade. Therefore a purchaser can be disappointed when they receive their purchased item.

It is an object of embodiments of the present invention to mitigate one or more problems of the prior art.

BRIEF SUMMARY OF THE DISCLOSURE

According to an aspect of the disclosure there is provided a method for identifying object colour from an image. The method may comprise obtaining image data; correcting the colour balance of the image data to obtain corrected image data, wherein the correcting is based on colour reference data in the image data; obtaining regional image data in the corrected image data; analysing the regional image data to identify one or more colour values representative of the pixel colour values; weighting the colour values according to the distribution of that pixel colour value in the regional image data; generating an item colour profile from the regional image data wherein colour profile comprises a set of the weighted colour values.

According to another aspect of the disclosure there is provided a computer-implemented method for identifying skin tone from an image, comprising obtaining image data, correcting the colour balance of the image data to obtain corrected image data, wherein the correcting is based on colour reference data in the image data; obtaining facial image data in the corrected image data, wherein the facial image data represents a face of a user; selecting image data corresponding to at least one facial region from the facial image data to obtain facial region data; analysing pixel colour values in the facial region data to identify one or more facial colour values representative of the pixel colour values of the facial region data; weighting the facial colour values according to the distribution of pixel colour values in the facial region data; and generating a user skin tone profile from the facial region data, wherein the skin tone profile comprises a set of the weighted colour values.

Optionally, the method may comprises selecting at least one make-up product from a make-up database, wherein the make-up database comprises identifying information for a plurality of make-up products and colour information for each make-up product therein, wherein the selecting comprises selecting a make-up product having colour information complementary to the user skin tone profile.

Optionally, the selecting comprises calculating the colour difference between the user skin tone profile and colour information for a subset of make-up products in the database.

According to yet another aspect of the disclosure, there is provided computer-implemented method for recommending a foundation product from an image, comprising obtaining image data, correcting the colour balance of the image data to obtain corrected image data, wherein the correcting is based on colour reference data in the image data; obtaining facial image data in the corrected image data, wherein the facial image data represents a face of a user; selecting image data corresponding to at least one region of skin from the facial image data to obtain facial region data; analysing pixel colour values in the facial region data to identify one or more facial colour values representative of the pixel colour values of the facial region data; weighting the facial colour values according to the number of pixel colour values corresponding to each facial colour value in the facial region data; and generating a user skin tone profile from the facial region data, wherein the user skin tone profile comprises a set of the weighted facial colour values; selecting at least one foundation product from a foundation database, wherein the foundation database is a k-d tree database comprising identifying information and colour information for each of a plurality of foundation products, wherein the selecting comprises, for each facial colour value of the user skin tone profile, performing a nearest neighbour search of the colour information in the database to identify a subset of foundation products, determining a value for a colour difference metric for each of the subset from the facial colour value, and deriving a score for each foundation product of the subset wherein the score is a function of the weight for that facial colour value and the determined value for the colour difference metric, for each foundation product, accumulating any score from the facial colour values of the user skin tone profile, and providing the identification information of the foundation product with the best score.

Optionally, the facial colour values, pixel colour values, and foundation product colour information are CIELAB values.

Optionally, the method may comprise analysing the pixel colour values of the facial region data to remove pixels whose pixel colour values do not correspond to a known skin tone, based on comparison with a stored record of known skin tones.

Optionally, analysing the pixel colour values comprises using a clustering algorithm. The clustering algorithm may output a set of centroids. The centroids may be used as the facial colour values.

The clustering algorithm may be a mean-shift algorithm. Optionally, the clustering comprises carrying out a mean shift operation on the a*b* values of CIELAB pixel colour values and recording the average L value for each a*b* value.

Optionally, weighting the facial colour values comprises analysing the pixel colour values for a subset of pixels in facial region data and their similarity to the facial colour values, and weighting the facial colour values according to the number of pixel colour values corresponding to each facial colour value in the subset of pixels. Analysing the similarity may comprises using a colour difference metric. The subset may be a random selection of pixels from the facial region data.

Optionally, the colour difference metric is $\Delta E'_{00}$.

Optionally, the nearest neighbour search may use Euclidean distance based on CIELAB values.

Optionally, deriving the score for each foundation product comprises dividing the weight for the facial colour value by a function of the $\Delta E'_{00}$. The function of the $\Delta E'_{00}$ may be $\Delta E'_{00}$ the plus a constant Optionally, correcting the colour balance comprises identifying colour reference data in the image data, wherein the colour reference data represents an image of a reference colour item comprising at least one reference colour; deriving, based on the colour reference data and stored data identifying the at least one reference colour of the reference colour item, a function to transform the colour reference data to match the at least one reference colour on the colour reference item; applying the function to the image data to obtain corrected image data. The function may be a colour correction matrix.

Optionally, the reference colour item comprises at least ten reference colours. In an example the reference colour item comprises twenty colours.

Optionally, obtaining facial image data in the corrected image data comprising carrying out an initial facial recognition process followed by a facial pose identification process.

Optionally, selecting image data corresponding to at least one facial region may comprise selecting image data corresponding to at least one of a user's forehead, one or both cheeks, chin and nose According to a further aspect of the disclosure there is provided an electronic device for identifying colour from an image, comprising: an input configured to receive image data; one or more processors; and a memory storing computer executable instructions therein which, when executed by the one or more processors, cause the one or more processors to: correct the colour balance of the image data to obtain corrected image data, wherein the correction is based on colour reference data in the image data; obtain regional image data in the corrected image data; analyse the regional image data to identify one or more colour values representative of the pixel colour values; weight the colour values according to the distribution of that pixel colour value in the regional image data; generate an item colour profile from the regional image data wherein colour profile comprises a set of the weighted colour values.

According to a still further aspect of the disclosure there is provided an electronic device for identifying skin tone from an image, comprising: an input configured to receive image data; one or more processors; and a memory storing computer executable instructions therein which, when executed by the one or more processors, cause the one or more processors to: correct the colour balance of the image data to obtain corrected image data, wherein the correction is based on colour reference data in the image data; obtain facial image data in the corrected image data, wherein the facial image data represents a face of a user; select image data corresponding to at least one facial region from the facial image data to obtain facial region data; analyse pixel colour values in the facial region data to identify one or more facial colour values representative of the pixel colour values of the facial region data; weight the facial colour values according to the distribution of pixel colour values in the facial region data; and generate a user skin tone profile from the facial region data, wherein the skin tone profile comprises a set of the weighted colour values.

Optionally there may be provided an electronic device wherein the one or more controllers may comprise colour balance correcting means to correct the colour balance of the image data to obtain corrected image data, wherein the correction is based on colour reference data in the image data; facial image data obtainment means to obtain facial image data in the corrected image data, wherein the facial image data represents a face of a user; image data selecting means to select image data corresponding to at least one facial region from the facial image data to obtain facial region data; pixel colour value analysis means to analyse pixel colour values in the facial region data to identify one or more facial colour values representative of the pixel colour values of the facial region data; facial colour value weighting means to weight the facial colour values according to the distribution of pixel colour values in the facial region data; and skin tone profile generating means to generate a user skin tone profile from the facial region data, wherein the skin tone profile comprises a set of the weighted colour values.

Optionally, the one or more processors are configured to select at least one make-up product from a make-up database, wherein the make-up database comprises identifying information for a plurality of make-up products and colour information for each make-up product therein, and wherein the one or more processors are configured to select a make-up product having colour information complementary to the user skin tone profile.

Optionally, the one or more processors are configured to calculate the colour difference between the user skin tone profile and colour information for a subset of make-up products in the database, so as to select the at least one make-up product from a make-up database.

According to a still further aspect of the disclosure electronic device for recommending a foundation product, comprising: an input configured to receive image data; a processor; and a memory storing computer executable instructions therein which, when executed by the processor, cause the processor to: correct the colour balance of the image data to obtain corrected image data, wherein the correction is based on colour reference data in the image data; obtain facial image data in the corrected image data, wherein the facial image data represents a face of a user; select image data corresponding to at least one region of skin from the facial image data to obtain facial region data; analyse pixel colour values in the facial region data to identify one or more facial colour values representative of the pixel colour values of the facial region data; weight the facial colour values according to the number of pixel colour values corresponding to each facial colour value in the facial region data; generate a user skin tone profile from the facial region data, wherein the user skin tone profile comprises a set of the weighted facial colour values; select at least one foundation product from a foundation database, wherein the foundation database comprises identifying information and colour information for each of a plurality of foundation products, wherein the instruction to select comprise instructions to: for each facial colour value of the user skin tone profile, perform a nearest neighbour search of the colour information in the database to identify a subset of foundation products, determine a value for a colour difference metric for each of the subset from the facial colour value, and derive a score for each foundation product wherein the score is a function of the weight for that facial colour value and the determined value for the colour difference metric, for each foundation product, accumulate the scores from each of the facial colour values of the user skin tone profile, and provide the identification information of the foundation product with the best score Optionally, the facial colour values, pixel colour values and foundation product colour information are CIELAB values.

Optionally, the one or more processors are configured to carry out a mean shift clustering operation on the a*b* values of CIELAB pixel colour values and record the average L value for each a*b* value to provide the clustering.

Optionally, the processor is configured to weight the facial colour values by analysing the pixel colour values of a subset of pixels in the facial region data, assessing their similarity to the facial colour values, and weighting the facial colour values according to the number of pixel colour values corresponding to each facial colour value in the subset of pixels. The subset may be a random selection of pixels from the facial region data. The similarity may be assessed using a colour difference metric.

The colour difference metric may be $\Delta E^*_{00}$.

The nearest neighbour search may be adapted to use Euclidean distance based on the CIELAB values.

Optionally, the processor is configured to calculate a score for each foundation product by dividing the weight for the facial colour value by a function of the $\Delta E^*_{00}$. The function of the $\Delta E'_{00}$ may be the $\Delta E'_{00}$ plus a constant.

Optionally, the one or more processors are configured to analyse the pixel colour values of the facial region data to remove pixels whose pixel colour values do not correspond to a known skin tone, based on comparison with a stored record of known skin tones.

Optionally, the one or more processors are configured to analyse the pixel colour values using a clustering algorithm. The clustering algorithm may be configured to output a set of centroids. The one or more processors may be configured to use the centroids as the facial colour values.

Optionally, the one or more processors are configured to correct the colour balance by identifying colour reference data in the image data, wherein the colour reference data represents an image of a reference colour item comprising at least one reference colour; derive, based on the colour reference data and stored data identifying the at least one reference colour of the reference colour item, a function to transform the colour reference data to match the at least one reference colour on the colour reference item; apply the function to the image data to obtain corrected image data. The function may be a colour correction matrix.

Optionally, the one or more processors are configured to obtain facial image data in the corrected image data by carrying out an initial facial recognition process followed by a facial pose identification process.

According to yet another aspect of the invention, there is provided a non-transitory computer readable medium comprising computer readable instructions that, when executed by a processor, cause performance of the methods described above..

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention are further described hereinafter with reference to the accompanying drawings, in which.

DETAILED DESCRIPTION

Figure 1:
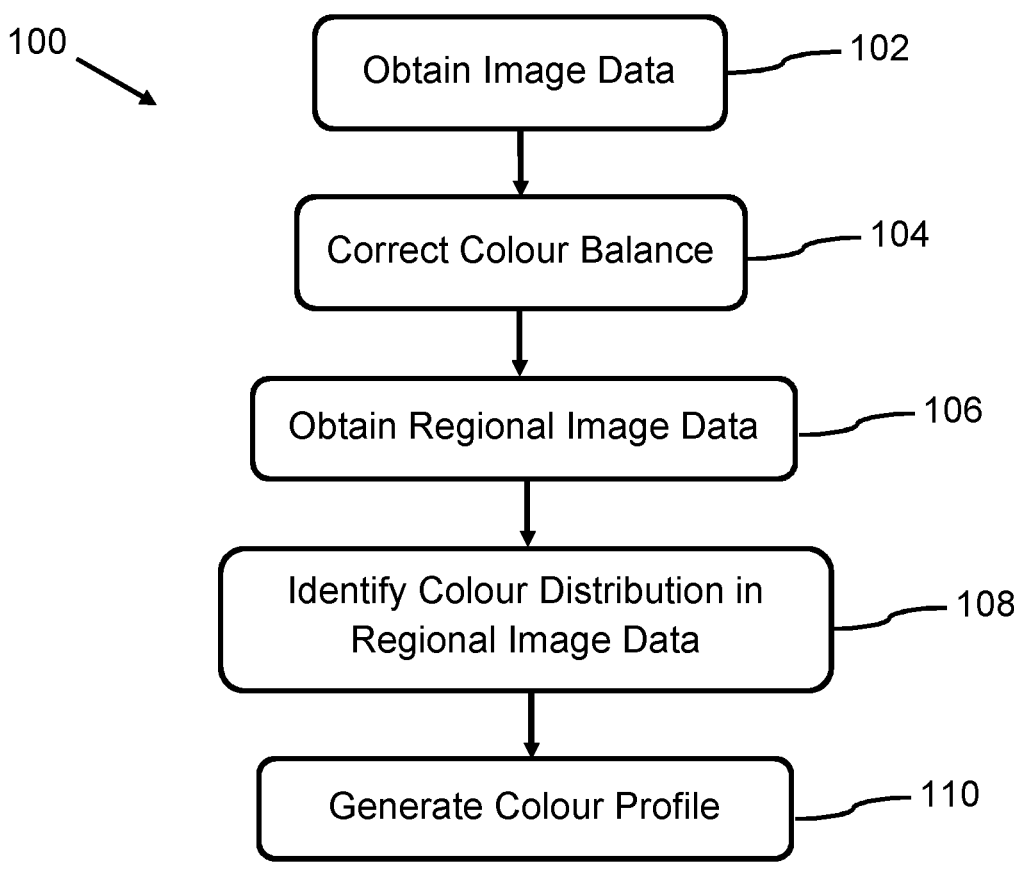
FIG. 1 is a flow diagram of a general method according to the invention.

Referring initially to FIG. 1, there is shown a flow diagram of a method, indicated generally by the reference numeral 100, of a general computer-implemented method according to the disclosure. The method aims to accurately identify the colour or colours of an item in an image.

Figure 2:
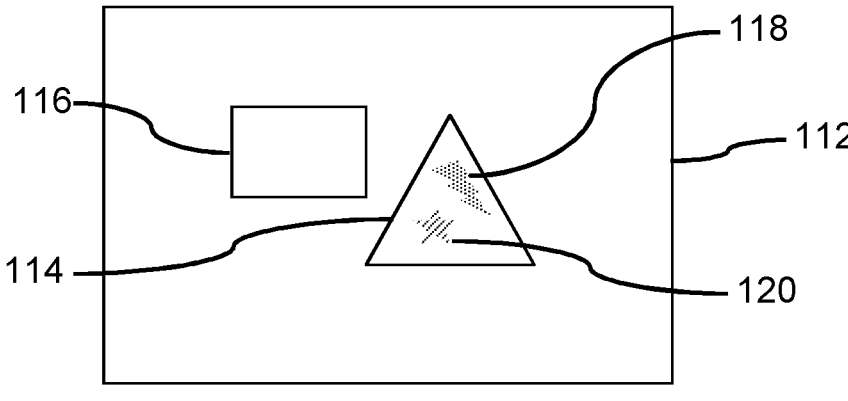
FIG. 2 is a diagram of an example image that may be processed according to the method illustrated in FIG. 1.

In step 102, image data of the item is obtained. Typically, the image data is a photograph, such as may be captured by a digital camera. The image data may be transmitted to a server for analysis and processing. The image data comprises item image data and colour reference data. Referring to FIG. 2, there is shown a diagram of an example image 112 that may be processed by the method 100. The image includes an item of interest 114 and a colour reference item 116. The image data of the image 122 will comprise item image data representing the item of interest 114 and colour reference data representing the colour reference item 116. The item of interest 114 comprises two regions of interest 118, 120. Image data representing the regions of interest 118, 120 may be referred to as regional image data. The item of interest 114 may comprise greater or fewer than two regions of interest. In some examples, there may be no regions of interest and the regional image data represents the same image portions of the image as the item image data.

In step 104, the colour balance of the image data is corrected to obtain corrected image data. The colour correction is based on colour reference data in the image data. The process of colour correction will be described in greater detail hereinafter. In step 106, the image data relating to the regions of interest is extracted from the corrected image data. The regions of interest 118, 120 may be identified manually, for example by the user. Additionally or alternatively, the regions of interest may be identified using one or more computer vision techniques for object identification or the like. Suitable computer vision techniques are known to the person skilled in the art. Once the regions of interest 118, 120 have been identified, the regional image data is identified in step 106. The locations of the pixels in the regional image data may be disregarded such that the regional image data comprises just the pixel colour values of each pixel in the regions of interest.

In step 108, the pixel colour values of the regional image data are analysed to identify one or more colour values representative of the pixel colour values of the regional image data. The representative colour values are then weighted according to the distribution of pixel colour values in the regional image data. In this way, the number of pixels having a pixel colour value the same or similar to the representative colour values are used to weight the representative colour values. The representative colour values may be a subset of the pixel colour values in the regional image data, or in some examples, some or all of the representative colour values may not form part of the set of pixel colour values.

In step 110, an item colour profile is generated from the regional image data. The item colour profile comprises a set of the weighted colour values. The item colour profile may include each of the weighted representative colour values, or it may be a subset of the weighted representative colour values. A suitable subset may include only those weighted representative colour values having a weight above a certain threshold, or a predefined number of the highest weighted representative colour values only.

The disclosure may further comprise to recommending a product based on the item colour profile, wherein the recommended product is complementary to the item colour profile.

Figure 3:
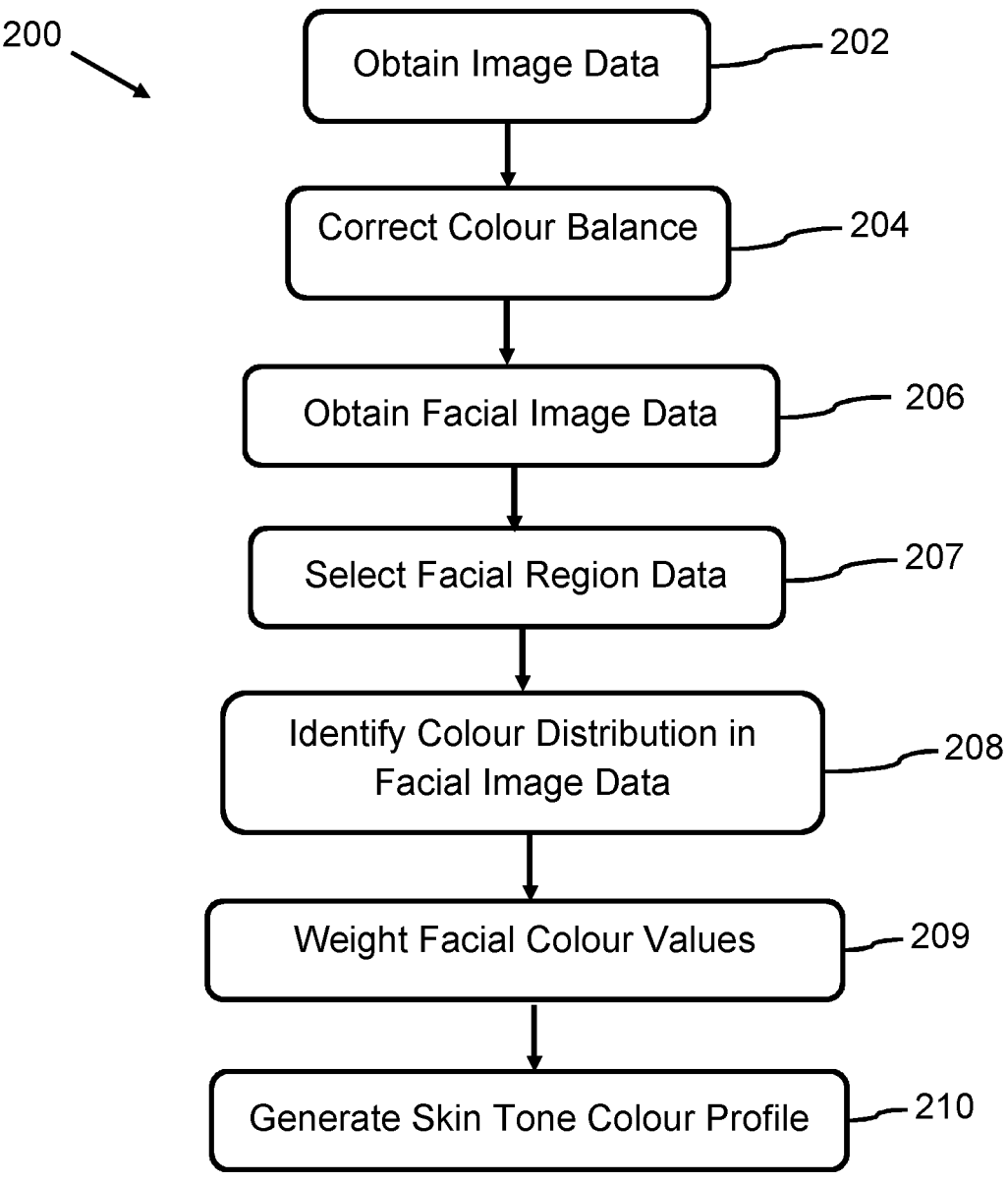
FIG. 3 is a flow diagram of a method according to an embodiment of the invention.
Figure 4:
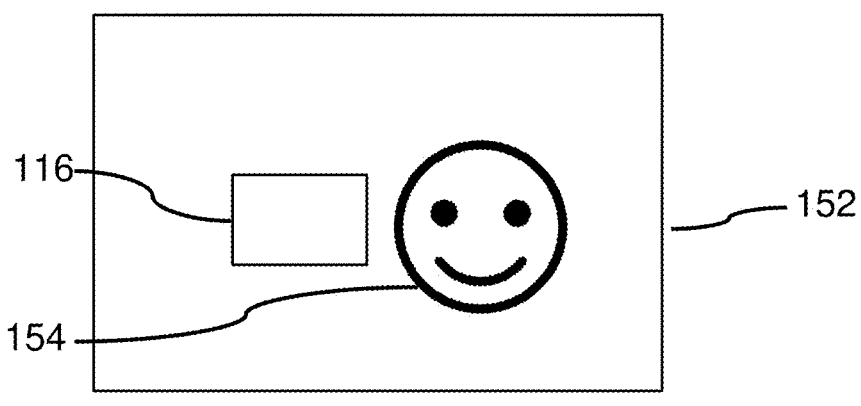
FIG. 4 is a diagram of an example image that may be processed according to the method illustrated in FIG. 3.

Referring now to FIGS. 3 and 4, there is shown a flow chart of a method indicated generally by the reference number 200, and a diagram of an example of an image 152 to be processed according to the method, respectively. The method 200 relates to a computer-implemented method for identifying skin tone from an image 152. The method 200 is similar to the method 100 of FIG. 1, and where the same steps are present, the same reference numeral has been used.

The image 152 comprises an image of a user's face 154 and a colour reference item. Other items (not shown) may be present in the image.

In step 202, image data may be obtained. Typically, the image data is a photograph, such as may be captured by a digital camera. The image format may be in any suitable format such as a jpeg or the like. The image data comprises facial image data and colour reference data. However, at the time the image data is obtained, the facial image data and the colour reference data are not classified within the image data. The image data of the image 152 will comprise facial image data representing the user's face 154 and colour reference data representing the colour reference item 116.

In step 204, similar to step 104 of the method 100, the colour balance of the image data is corrected to obtain corrected image data. The colour correction is based on colour reference data in the image data. The colour correction may be implemented according to known methods of colour correction, and an example method will be described in more detail hereinafter.

In step 206, facial image data is identified in the corrected image data. The facial image data may be identified in the image data or the corrected image data by the user, for example by selecting areas of the image via a GUI of a user device. For example, the user may be presented with the image, and asked to circle the face in the image. Alternatively or additionally, the facial image data in the corrected image data may be identified automatically, for example using facial recognition techniques.

Once the facial image data has been obtained in step 206, next in step 207, image data corresponding to at least one facial region is selected from the facial image data to obtain facial region data. The facial region data relates to a region of skin in the facial image data. Facial image data corresponding to at least one of a user's forehead, one or both cheeks, chin and nose may be selected. These areas are useful as they avoid areas such as eyes, lips, facial hair and other areas that could provide misleading information as to the tone of the skin. As above with identifying the face in the image, selecting the facial regions may be done manually, or automatically. For example, the facial image data may be further analysed to identify the pose of the face therein, then the desired regions may be selected.

In step 208, the pixel colour values in the facial region data are analysed to identify one or more facial colour values representative of the pixel colour values of the facial region data. The pixel colour values may be analysed using a clustering method to identify the facial colour values. Step 208 may optionally include removing pixels whose pixel colour values do not correspond to a known skin tone, based on comparison with a stored record of known skin tones.

In step 209, the facial colour values are weighted according to the distribution of pixel colour values in the facial region data. The number of pixels having a pixel colour value the same or similar to the facial colour values may be used to weight the representative colour values.

In step 210, a user skin tone profile is generated from the facial region data, wherein the skin tone profile comprises a set of the weighted colour values. The user skin tone profile may comprise the full set of weighted colour values or a subset thereof. A suitable subset may include only those weighted representative colour values having a weight above a certain threshold, or a predefined number of the highest weighted representative colour values only.

The method 200 may be implemented on a user computing device such as a smartphone device, tablet, laptop or desktop computer, or other such device, or may be implemented on a server providing the skin tone identification service to the user. If the method is implemented on server the user may transmit the image data to the server, directly or indirectly, and the server will transmit the results to the user.

Referring now to FIG. 5(*a*), there is shown a flow-chart illustrating a further embodiment of the invention. FIG. 5(*a*) illustrates a computer-implemented method, indicated generally by the reference numeral 300, for recommending a make-up product to a user, where the make-up product is recommended to be complementary to the user's skin tone profile. The method 300 of FIG. 5(*a*) is very similar to that of FIG. 3 and includes steps 202 to 210 described therein. The method 300 includes the additional step 212 where a make-up product is selected from a make-up database, wherein the make-up product colour information is complementary to the user skin tone profile. The make-up database comprises identifying information for a plurality of make-up products and colour information for each make-up product therein. In an example, the make-up product is a foundation, and the recommending step 212 aims to recommend a foundation that is close to the user's own skin tone. In other examples, the make-up product may be a blush, bronzer, contour, concealer, highlighter, lipstick or the like, and may be chosen to pair well with the user's skin tone, according to known colour theory.

Typically, the methods of FIGS. 1, 3 and 5 are carried out with the colour values represented using CIELAB values, which expresses colour as three values: L* for the lightness from black to white, in a range from 0 to 100; a* from green (−) to red (+), and b* from blue (−) to yellow (+). In the present example, the a* and b* values range from −128 to +128. The CIELAB colour space facilitates the use of colour difference metrics such as $\Delta E'_{00}$ which may be referred to as delta-e. CIELAB is approximately perceptually uniform, which allows the analysis of the facial colour data as per step 208 and the selecting step 212 to perform efficient analyses in a comparable way to the human eye. For example, when selecting complimentary cosmetics in step 212, CIELAB is a computationally efficient space for approximating $\Delta E'_{00}$ (for example using the k-d tree with the Euclidean CIELAB distance metric). It will be understood by the person skilled in the art that the invention is not limited to the use of CIELAB colour values and other colour spaces may also be used.

Figure 6:
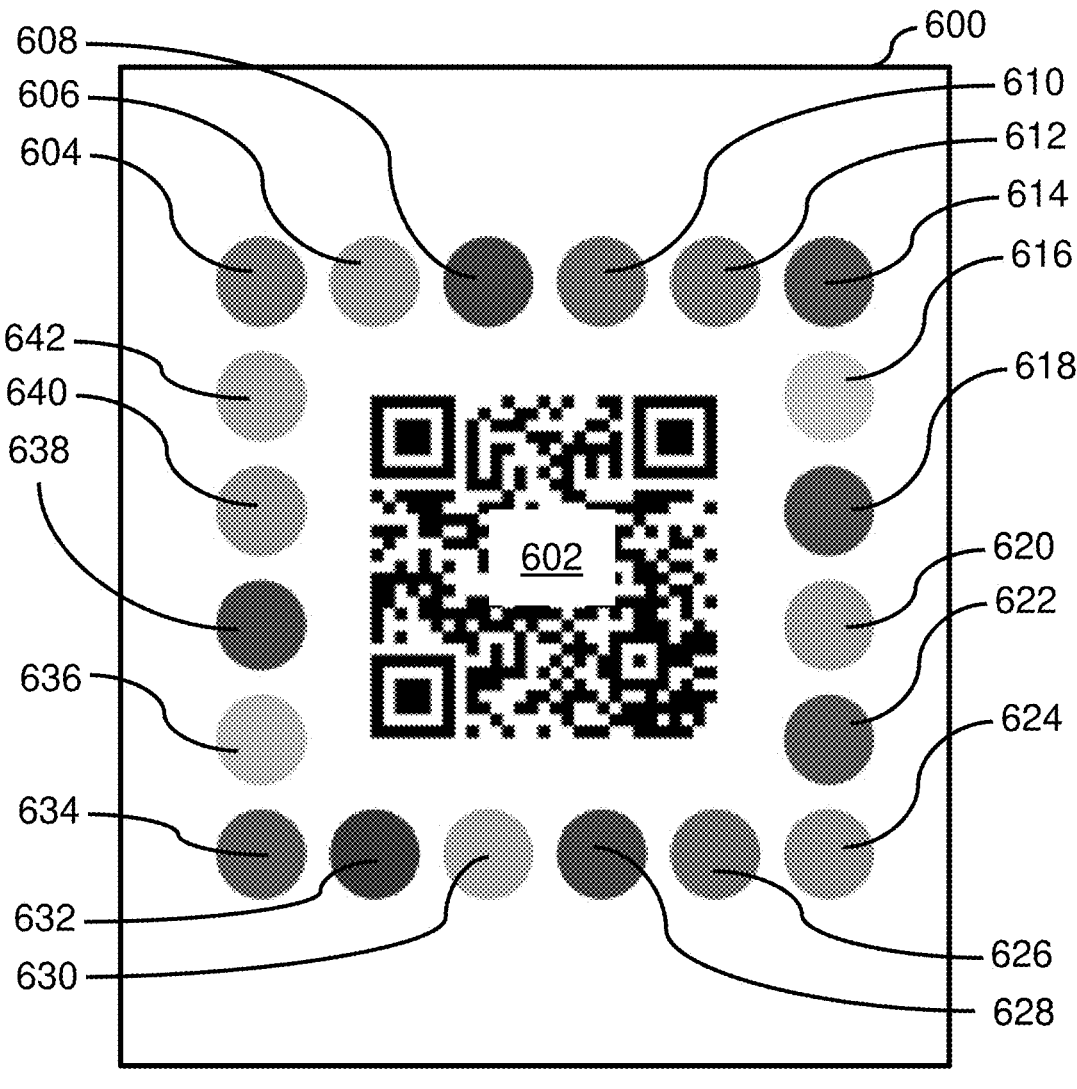
FIG. 6 is an illustration of a colour reference item suitable for use with embodiments of the invention.

Referring now to FIG. 6, there is shown an example colour reference item 600 suitable for use in the methods described herein. The reference colour item is used in step, 104 and 204 to correct the colour balance in the image data. The colour reference item 600 comprises identification information, in this case a 2-dimensional bar code. The colour reference item 600 further comprises twenty reference colours, 604 to 642. Each reference colour is a circle. The twenty reference colours are arranged in a square surrounding the identification information. It will be understood that the reference colour item may comprise a greater or lesser number of reference colours, and that the colours may be arranged differently to how they are illustrated in FIG. 6.

The reference colours in CMYK values, clockwise from the top left are shown in Table 1 below.

TABLE 1

| Ref. No. | Cyan | Magenta | Yellow | Key |
|---|---|---|---|---|
| 604 | 0 | 0.75 | 0.25 | 0 |
| 606 | 0.25 | 0 | 0.75 | 0.2 |
| 608 | 0.75 | 0.75 | 0 | 0.2 |
| 610 | 0.75 | 0 | 0.75 | 0.2 |
| 612 | 0.75 | 0 | 0.25 | 0.2 |
| 614 | 0.58 | 0 | 0.58 | 0.52 |
| 616 | 0 | 0 | 0.25 | 0.2 |
| 618 | 0 | 0.58 | 0 | 0.52 |
| 620 | 0 | 0.15 | 0.15 | 0.3 |
| 622 | 0.25 | 0.75 | 0 | 0.2 |
| 624 | 0.25 | 0.25 | 0 | 0.2 |
| 626 | 0 | 0.62 | 0.62 | 0.2 |
| 628 | 0 | 0 | 0 | 0.8 |
| 630 | 0.25 | 0 | 0.25 | 0.2 |
| 632 | 0.58 | 0.58 | 0 | 0.52 |
| 634 | 0.35 | 0 | 0 | 0.6 |
| 636 | 0 | 0 | 0.62 | 0.2 |
| 638 | 0.01 | 0.38 | 0 | 0.68 |
| 640 | 0 | 0.25 | 0.75 | 0.2 |
| 642 | 0 | 0.25 | 0 | 0.25 |

The reference colours are chosen to be represented by round-number ratios of cyan, magenta, yellow, and black colours. These colours are typically used to calibrate printing presses, and as such, the colour reference item can be reproduced to these specifications accurately. The reference colours distribute reasonably evenly over the range printable with CMYK, avoiding saturated single colours.

When the image data is obtained at the start of the methods disclosed herein, the next step is to correct the colour balance of the image data. Correcting the colour balance comprises identifying colour reference data in the image data, wherein the colour reference data is the portion of the image data which represents the reference colour. Next, the method derives a function to transform the colour reference data to match the reference colours on the colour reference item 600. The function may be a colour correction matrix. When the function has been calculated, it is applied to the image data to obtain corrected image data, wherein the corrected image data is colour balanced.

Steps 206 and 207 allow the methods to obtain a set of colours that are present in areas that are skin areas in the face. The methods describe herein recognise that to identify a skin tone for a user, it is preferable to remove skin bordering on eyes, lips, nostrils, and eyebrows from the analysis. Step 206 of obtaining facial image data from the corrected image data may comprise using a machine learning model to identify the area of the image containing the user's face. This may be achieved in a number of ways, for example via the techniques included in the Dlib software library such as the Histogram of Oriented Gradients (HOG) algorithm; the Viola-Jones object detection framework; and genetic algorithm and the eigenface technique. In this way, pixel locations of facial landmarks are obtained. The pose of the user in the image may then be estimated by comparing the 2D projections of the same landmarks from a 3D model of a model face for example the Candide 3.0 model, and using an error-minimisation technique to estimate the translation, rotation, scale and facial deformation parameters (for example Candide-3). One suitable error-minimising technique may be Newton-Raphson error-minimising, but other techniques will be apparent to the person skilled in the art. This provides a 3D model of the face from which relevant areas of the face may be identified, in step 207. The relevant areas are regions of skin in the face, and avoid non-skin areas such as eyes, facial hair and the like. Such areas of interest in the face may be cheek and forehead areas. As the cheek and forehead areas are the largest areas, they provide a useful level of data to be analysed. The areas of interest may further include the bridge of the nose and the chin.

Once the relevant areas of the face have been identified, their pixels are combined as the facial image data. At this point in the method, the location data for the pixels in the facial image data may be disregarded, and only the pixel colour values stored for subsequent processing. In an example, in a 2-megapixel image, approximately 70,000 pixels were identified as forming the facial image data. It will be understood that the number of pixels forming the facial image data will vary depending on the size of the user's face in the image. The method may include steps to request a further image, e.g. retake a photograph, if the facial area in the photo is not large enough to provide sufficient data.

Step 208 of analysing pixel colour values in the facial region data to identify one or more facial colour values representative of the pixel colour values of the facial region data aims to compute representative skin tone colours from the facial regions of interest. Identifying the colour distribution in the facial image data may comprise using a clustering method on the facial image data. For example, a clustering method using cluster centroids may be used. In an example, the clustering method used is unsupervised, and does not require that the number of clusters be specified before analysing the data. One such suitable clustering method is the mean-shift method. When using a clustering method that provides cluster centroids, the centroids of the resulting clusters may be used as the facial colour values.

In a preferred example, the pixel colour values of the pixels of the facial image data are extracted in CIELAB format. A mean shift clustering algorithm is performed on the a*b* values of the pixels extracted, whilst recording the average L value for each a*b* value. This is an approximation for doing a mean shift clustering in CIELAB space that is more memory efficient. The mean shift algorithm uses a flat kernel, however other kernels may be used. This provides a set of clusters, each having a centroid value, and a number of pixels associated with the cluster. The cluster centroids may be considered the facial colour values. All the pixels in a cluster will be closer, within the colour space, to the centroid of that cluster than any other centroid. Typically, the centroids are less than a $\Delta E'_{00}$ of 10 from all the points in their cluster. Typically, the clustering step may output between one and ten clusters. It will be understood that this method of carrying out mean shift clustering in a colour space is not limited to use with the specific methods described herein.

Once the clustering has been performed, the cluster centroids are analysed to check their distance to a range of known skin tones. The value of the cluster centroid is a representative colour for a group of similar colours, such that that value itself may not be present in the facial image data. Such range of known skin tones may be stored in memory accessible by the method. In an example, the similarity is determined by only considering clusters where the smallest $\Delta E'_{00}$ between the centroid and the known skin tones is less than 10. Any cluster whose centroid is too far away from the known skin tones is discarded and not processed any further. In this way, pixels relating to non-skin elements in the facial image data are not included in the generation of the skin tone profile. Such non-skin elements may include glasses, jewellery or the like. Additionally, this also allows pixels related to discolourations and blemishes on the skin to be disregarded.

Next, in step 209, the facial colour values are weighted according to the distribution of pixel colour values in the facial region data. The weighting considers the number of pixel colour values corresponding to each facial colour value in the facial region data. To perform the weighting, the method makes a random selection of pixels from the remaining facial region data. In an example, the number of selected pixels is one hundred times the number of clusters (i.e. no. of clusters×100), however, it will be understood that a larger or smaller number of pixels may be used. Each of the selected pixels is then analysed in relation to the facial colour values. The analysis identifies to which facial colour value each pixel is closest in the colour space in use. This may be considered as identifying which facial colour value provides the best match to each pixel. In an example, the analysis identifies the facial colour value to which each pixel is perceptually closest. This similarity may be analysed using a colour difference metric, such as the $\Delta E'_{00}$ metric used with CIELAB colours. Each facial colour value is then weighted according to the number of pixels from the random selection that are closer to it than any of the other facial colour values. In this way, clusters containing a large number of pixel values are given high importance and those containing a small number of pixel values are given low importance. The random selection of pixels is representative of the overall pixel population. It will be understood that it is not essential to use only a selection of the pixels. However, using a selection of the pixels, and not the full set of pixels, is more computationally efficient, and does not result in a sacrifice in accuracy in the results. Other methods of weighting the facial colour values may also be used as will be apparent to the person skilled in the art.

The output from step 210 is a weighted list of centroids and represents the skin colour profile of the customer and corresponds to generating a user skin tone profile from the facial region data, wherein the skin tone profile comprises a set of the weighted colour values. In this way, the skin tone profile is a set of facial colour values weighed according to the number of pixels in the facial region data that are close to each facial colour value.

Figure 5A:
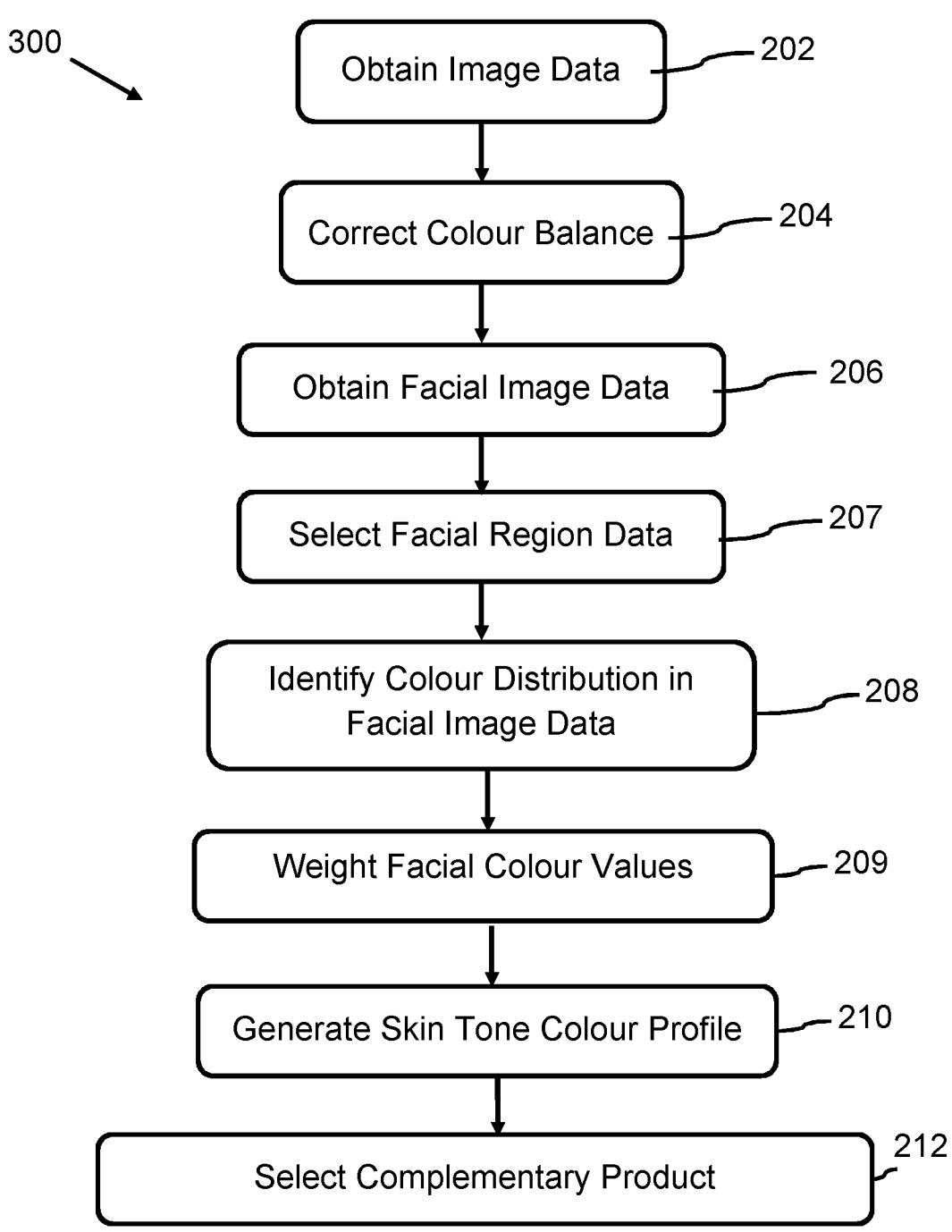
FIG. 5(a) is a flow diagram of a further method according to an embodiment of the invention.
Figure 5B:
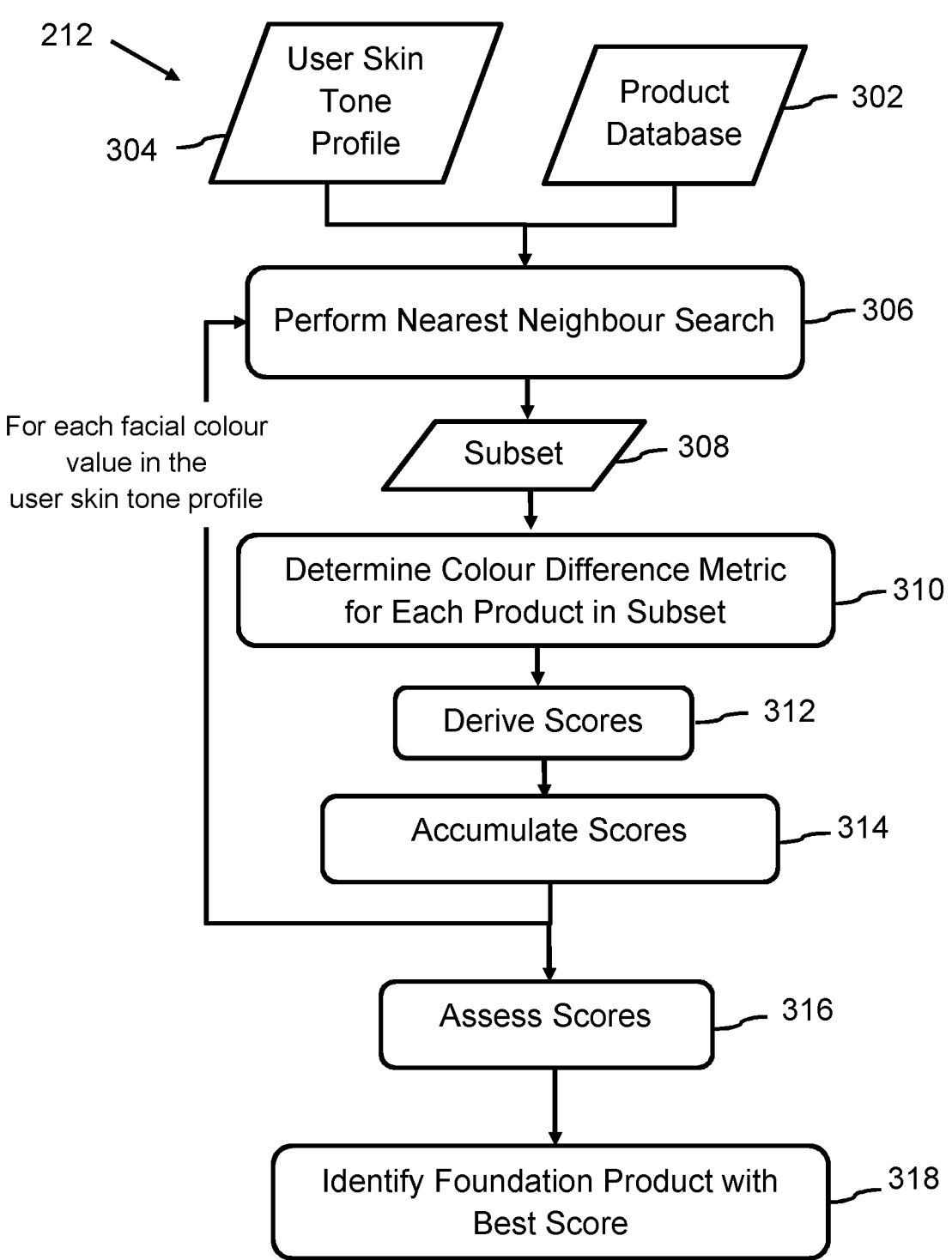
FIG. 5(b) is a flow diagram for a step of the method illustrated in FIG. 5(a)

Now referring to FIG. 5(b), there is shown a flow chart providing a more detailed description of step 212 of the method 300 of FIG. 5(a). For step 212, a foundation database 302 of foundation colours is maintained. The foundation database 302 comprises identifying information and colour information for each of a plurality of foundation products. The foundation database 302 may be a k-d tree database, with the colour information of the foundation products stored as CIELAB values. The colour information in the database 302 may be obtained by analysing a collection of foundation products with a spectrophotometer. The k-d tree data structure is useful for finding near matches for multidimensional entities like CIELAB colours.

The step 212 further takes the user skin tone profile 304 as an input. The user skin tone profile may be generated in step 210 as described in relation to the methods of FIG. 3 and FIG. 5(a). The selection process compares each facial colour value in the user skin tone profile to the colour information in the foundation database. The results for each facial colour value are then combined to identify a complementary product in the foundation database. The weights of the facial colour values may be used to identify the complementary product.

In step 306, the method comprises performing a nearest neighbour search of the colour information in the foundation database 302 to identify a subset 308 of foundation products that are close to the specific facial colour value being considered. In an example, this subset 308 comprises the five closest foundation products. For a k-d tree database, the subset 308 of the closest products to each facial colour value of the user skin tone profile may be selected using a Euclidean distance metric. The nearest neighbour search may use a Euclidean distance metric in the CIELAB colour space, however other colour distance metrics may be used.

In step 310, the method comprises determining a value for a colour difference metric for each foundation product of the subset 308 from the facial colour value of the user skin tone profile 304 that provided the subset. In this way, the perceptual differences between the CIELAB values in the candidate set, i.e. the subset 308 of foundation products, and the target skin tone are analysed, and the closest match selected.

In step 312, the method comprises deriving a score for each foundation product of the subset 308 wherein the score is a function of the weight for that facial colour value and the determined value for the colour difference metric. The closest foundation shade to each facial colour value of the user skin tone profile is given a score derived from the weight of the centroid and the value of the colour distance metric between the centroid and the colour information foundation product. The colour distance metric may be $\Delta E'_{00}$. In this way, the perceptual differences may be analysed by taking each centroid in the skin tone profile, and calculating which foundation shade has the smallest $\Delta E'_{00}$. Creating the subset 308, which may be considered as a "short list" of foundation products, is useful for processing efficiency, as it reduces the number of $\Delta E'_{00}$ calculations which can be computationally expensive. In an example, the score may be the weight of the facial colour value in question divided by a function of the $\Delta E'_{00}$ between the centroid and colour information of the foundation product. The function may be the $\Delta E'_{00}$ itself, or may be the $\Delta E'_{00}$ plus a constant.

In step 314, the method comprises accumulating any score from the facial colour values of the user skin tone profile. When a foundation product is included in a subset associated with a particular facial colour value, it will be assigned a score, as per step 312. If that foundation is included in another subset associated with another facial colour value, it will be assigned another score, which will be combined with it previous score. In this way, the scores for each foundation product are accumulated in a suitable manner, which may depend on the manner in which the scores are derived. In the example of the score being derived by the dividing the weight by the $\Delta E'_{00}$, the scores may be added together and the foundation product with the highest score may be selected.

When steps 306 to 314 have been completed for each facial colour value in the user skin tone profile, the combined scores for the various foundation products may be assessed in step 316.

In step 318, the method comprises providing the identification information of the foundation product with the best score. What constitutes the best score is determined by the manner of deriving and combining or accumulating the scores. As mentioned above, in the example of scores derived from the weight divided by $\Delta E'_{00}$, and summed together, then the foundation product with the highest score is the best score. Other scoring and accumulation mechanisms will be apparent to the person skilled in the art.

The method may further include asking the user for preferences in relation to the finish, coverage and other factors of the product so that these can be taken into consideration in making the recommendations to the user. The method may also issue recommendations comprising a closest match product, and a product one shade lighter and/or darker.

Figure 7:
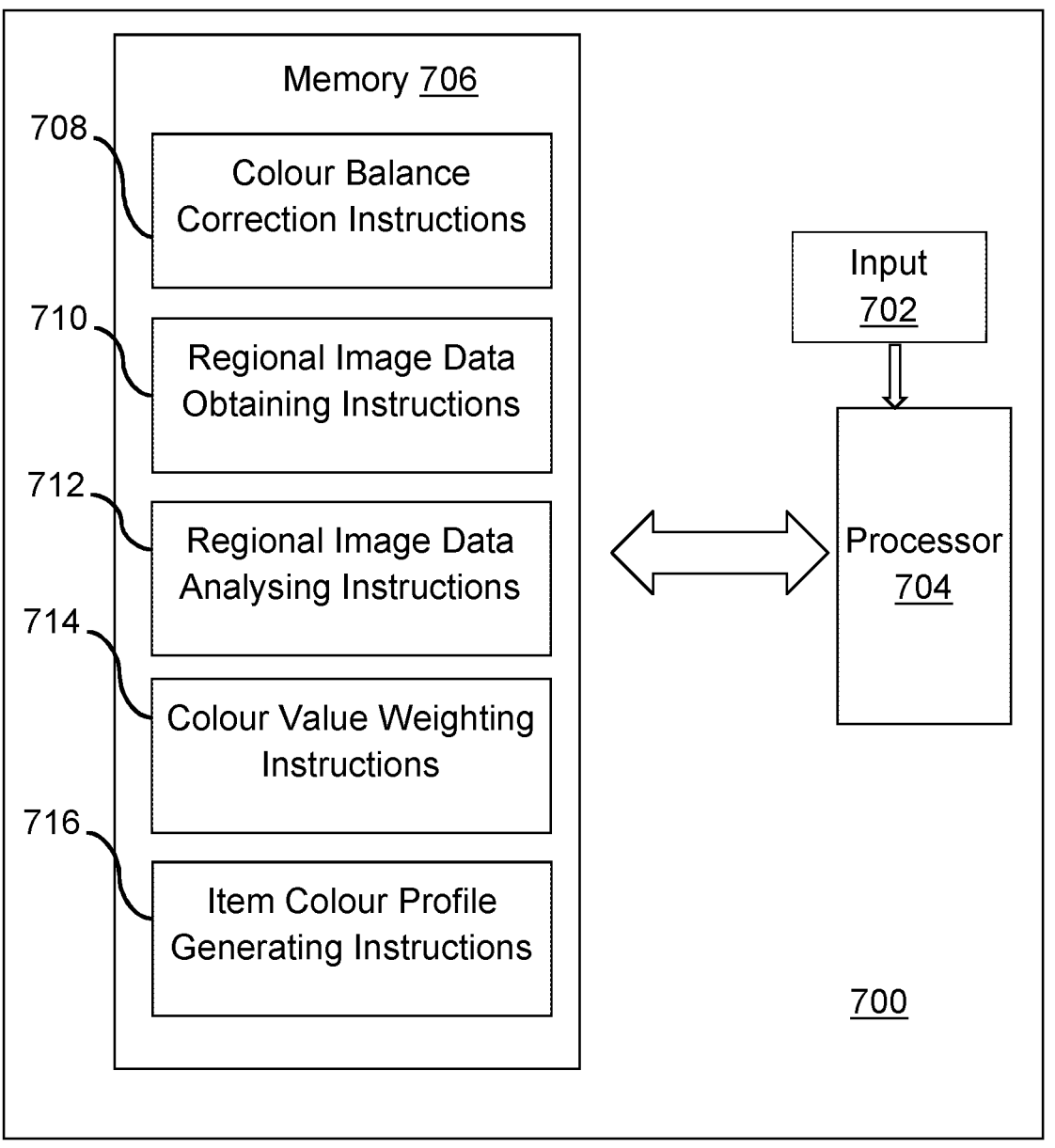
FIG. 7 is a block diagram of a general electronic device according to the invention.

FIG. 7 is a schematic of an example electronic device, indicated generally by the reference numeral 700. The electronic device 700 comprises an input 702, a processor 704, and memory 706. The memory 706 may comprise machine-readable instructions which, when executed by a processor, cause the processor to perform the methods discussed above. The memory 706 comprises machine-readable instructions which, when executed by a processor 704, cause the processor to correct the colour balance of the image data to obtain corrected image data, wherein the correction is based on colour reference data in the image data. The memory 706 comprises colour balance correction instructions 708 to perform the correction.

The memory 706 comprises machine-readable instructions which, when executed by a processor 704, cause the processor to obtain regional image data in the corrected image data. The machine-readable instructions comprise regional image data obtaining Instructions 710 to obtain the regional image data.

The memory 706 comprises machine-readable instructions which, when executed by a processor 704, cause the processor to, analyse the regional image data to identify one or more colour values representative of the pixel colour values. The memory 706 comprises regional image data analysing instructions 712 to perform the analysis.

The memory 706 comprises machine-readable instructions which, when executed by a processor 704, cause the processor to weight the colour values according to the distribution of that pixel colour value in the regional image data. The memory 706 comprises colour value weighting instructions 714 to perform the weighting.

The memory 706 comprises machine-readable instructions which, when executed by a processor 704, cause the processor to generate an item colour profile from the regional image data wherein colour profile comprises a set of the weighted colour values. The memory 706 comprises item colour profile generating instructions 714 to generate the item colour profile.

In some examples, the memory 706 may comprise additional machine-readable instructions which, when executed by a processor 704, cause the processor to select a product from a product database, wherein the selected product is complementary to the colours of the regions of interest in the item. The memory 706 may comprises item colour profile generating instructions 714 to generate the item colour profile.

In some examples, the memory 706 may comprises additional machine-readable instructions which, when executed by a processor 704, cause the processor to perform further actions in line with the methods and examples described herein.

Figure 8:
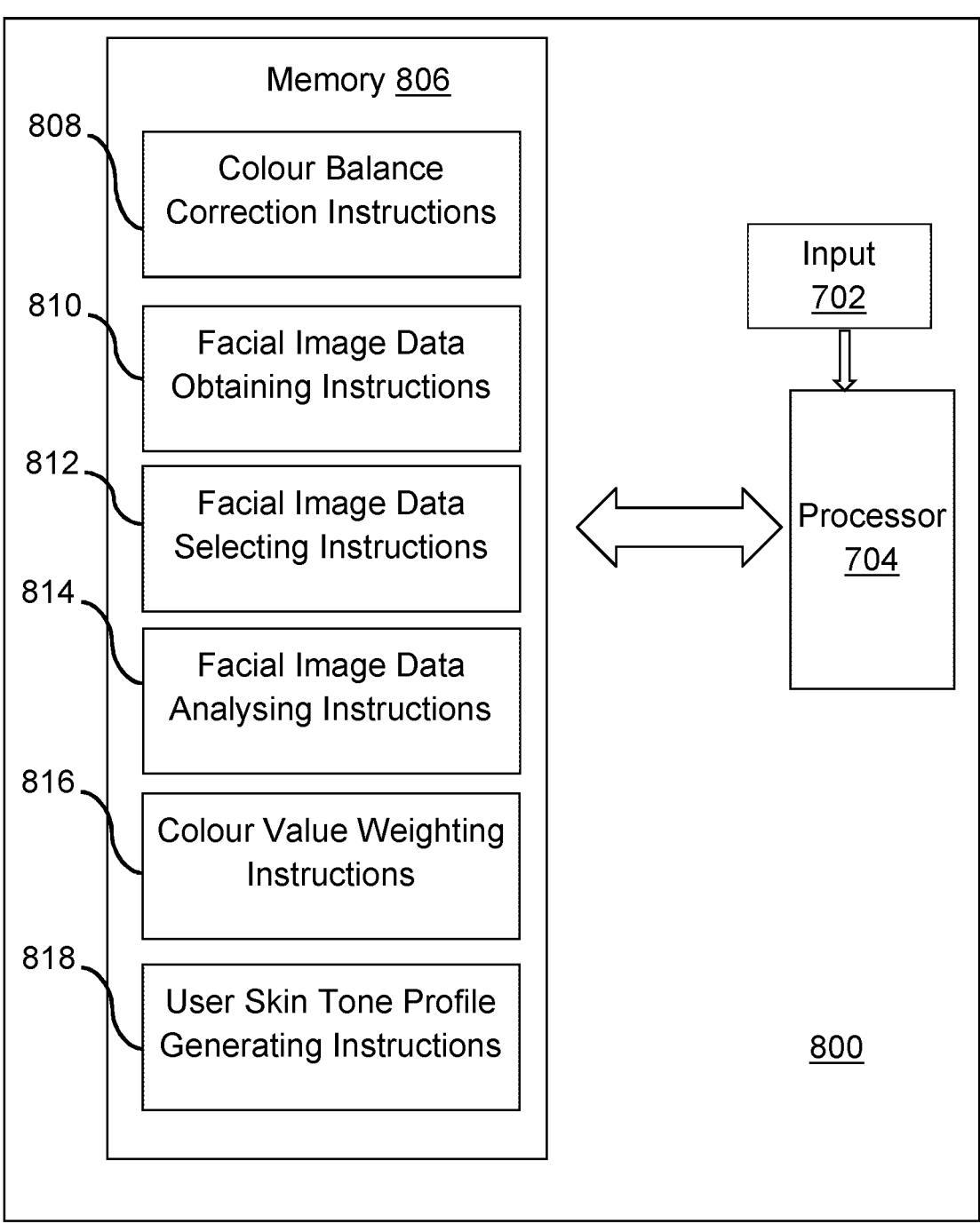
FIG. 8 is a block diagram of an electronic device according to an aspect of the invention.

FIG. 8 is a schematic of an example electronic device, indicated generally by the reference numeral 800. The electronic device 800 comprises an input 702, a processor 704, and memory 706. The memory 806 may comprise machine-readable instructions which, when executed by a processor, cause the processor to perform the methods discussed above.

The memory 806 comprises machine-readable instructions which, when executed by a processor 704, cause the processor 704 to correct the colour balance of the image data to obtain corrected image data, wherein the correction is based on colour reference data in the image data. The memory 806 comprises colour balance correction instructions 808 to perform the correction.

The memory 806 comprises machine-readable instructions which, when executed by a processor 704, cause the processor to obtain facial image data in the corrected image data, wherein the facial image data represents a face of a user. The memory 806 comprises facial image data obtaining instructions 810 to obtain the regional image data.

The memory 706 comprises machine-readable instructions which, when executed by a processor 704, cause the processor to, select image data corresponding to at least one facial region from the facial image data to obtain facial region data. The memory 706 comprises facial image data selecting instructions 812 to perform the selection.

The memory 806 comprises machine-readable instructions which, when executed by a processor 704, cause the processor to, analyse pixel colour values in the facial region data to identify one or more facial colour values representative of the pixel colour values of the facial region data. The memory 806 comprises facial image data analysing instructions 814 to perform the analysis.

The memory 806 comprises machine-readable instructions which, when executed by a processor 704, cause the processor to weight the colour values according to the distribution of that pixel colour value in the regional image data. The memory 806 comprises colour value weighting instructions 816 to perform the weighting.

The memory 806 comprises machine-readable instructions which, when executed by a processor 704, cause the processor to generate a user skin tone profile from the facial region data, wherein the skin tone profile comprises a set of the weighted colour values. The memory 706 comprises item user skin tone profile generating instructions 818 to perform the selection.

In some examples, the memory 806 may comprise additional machine-readable instructions which, when executed by a processor 704, cause the processor 704 to select at least one make-up product from a make-up database, wherein the make-up database comprises identifying information for a plurality of make-up products and colour information for each make-up product therein, and wherein the one or more processors are configured to select a make-up product having colour information complementary to the user skin tone profile. The memory 706 comprises make-up product selecting instructions to perform the selection.

In some examples, the memory 806 comprises additional machine-readable instructions which, when executed by a processor 704, cause the processor to perform further actions in line with the methods and examples described herein.

Figure 9:
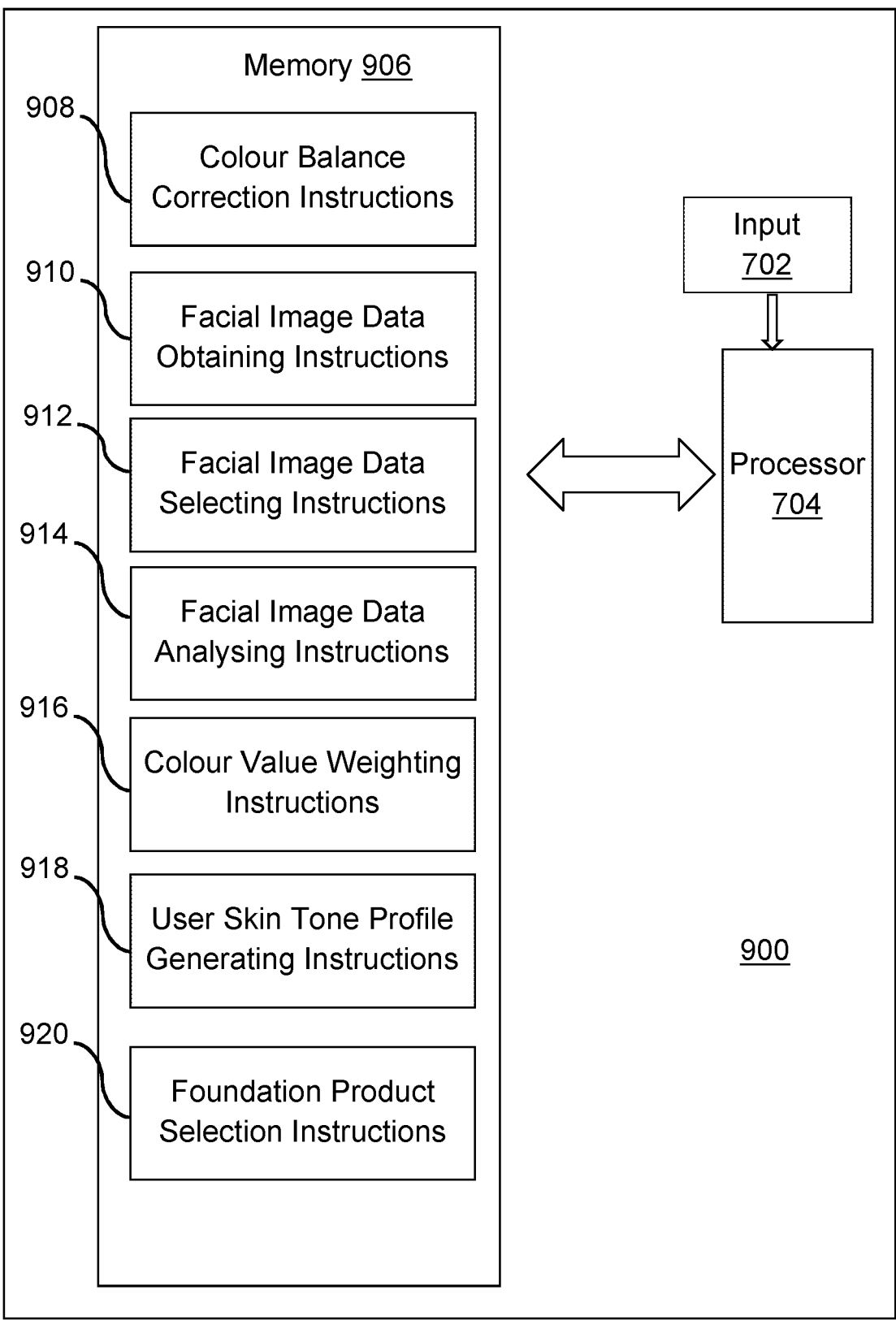
FIG. 9 is a block diagram of an electronic device according to an aspect of the invention.

FIG. 9 is a schematic of an example electronic device, indicated generally by the reference numeral 900. The electronic device 900 comprises an input 702, a processor 704, and memory 906. The memory 906 may comprise machine-readable instructions which, when executed by a processor, cause the processor to perform the methods discussed above.

The memory 906 comprises machine-readable instructions which, when executed by a processor 704, cause the processor 704 to correct the colour balance of the image data to obtain corrected image data, wherein the correction is based on colour reference data in the image data. The memory 906 comprises colour balance correction instructions 908 to perform the correction.

The memory 906 comprises machine-readable instructions which, when executed by a processor 704, cause the processor to obtain facial image data in the corrected image data, wherein the facial image data represents a face of a user. The memory 906 comprises facial image data obtaining instructions 910 to obtain the regional image data.

The memory 906 comprises machine-readable instructions which, when executed by a processor 704, cause the processor to, select image data corresponding to at least one facial region from the facial image data to obtain facial region data. The memory 706 comprises facial image data selecting instructions 912 to perform the selection.

The memory 906 comprises machine-readable instructions which, when executed by a processor 704, cause the processor to, analyse pixel colour values in the facial region data to identify one or more facial colour values representative of the pixel colour values of the facial region data. The memory 906 comprises facial image data analysing instructions 914 to perform the analysis.

The memory 906 comprises machine-readable instructions which, when executed by a processor 704, cause the processor to weight the colour values according to the distribution of that pixel colour value in the regional image data. The memory 906 comprises colour value weighting instructions 916 to perform the weighting.

The memory 906 comprises machine-readable instructions which, when executed by a processor 704, cause the processor to generate a user skin tone profile from the facial region data, wherein the skin tone profile comprises a set of the weighted colour values. The memory 906 comprises item user skin tone profile generating instructions 918 to perform the selection.

The memory 906 comprises machine-readable instructions which, when executed by a processor 704, cause the processor to select at least one foundation product from a foundation database, wherein the foundation database is a k-d tree database comprising identifying information and colour information for each of a plurality of foundation products. The memory 906 comprises foundation product instructions 920 to perform the selection.

In some examples, the foundation product instructions 920 may comprise additional machine-readable instructions which, when executed by a processor 704, cause the processor 704 to, for each facial colour value of the user skin tone profile, perform a nearest neighbour search of the colour information in the database to identify a subset of foundation products, determine a value for a colour difference metric for each of the subset from the facial colour value, and derive a score for each foundation product wherein the score is a function of the weight for that facial colour value and the determined value for the colour difference metric, accumulate the scores for each foundation product from each of the facial colour values of the user skin tone profile, and provide the identification information of the foundation product with the best score. The memory 906 comprises product selecting instructions to perform the selection. The product selecting instructions may comprise instructions to for each facial colour value of the user skin tone profile, perform a nearest neighbour search of colour information in the database to identify a subset of foundation products, determine a value for a colour difference metric for each of the subset from the facial colour value, and derive a score for each foundation product wherein the score is a function of the weight for that facial colour value and the determined value for the colour difference metric, for each foundation product, accumulate the scores from each of the facial colour values of the user skin tone profile, and providing the identification information of the foundation product with the best score.

In some examples, the memory 906 comprises additional machine-readable instructions which, when executed by a processor 704, cause the processor to perform further actions in line with the methods and examples described herein.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus, functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

The methods of the disclosure cause the image colour balance to be corrected using reference colours from the colour reference item. The 2D positions of facial features are identified in the image and mapped onto a 3D facial model. Characteristic skin tones are calculated using colours extracted from important features of the 3D model, and compared with a database of cosmetic product colours to compute recommendations. The characteristic skin tones may be referred to as a skin tone profile, which comprises an indication of the colour distribution of pixels in the facial region data.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine-readable storage storing such a program. Still further, embodiments of the present invention may be conveyed electronically via any medium such as a communication signal carried over a wired or wireless connection and embodiments suitably encompass the same.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A computer-implemented method for recommending a foundation product from an image, comprising obtaining image data comprising facial image data that represents a face of a user, correcting a colour balance of the image data to obtain corrected image data, wherein the correcting is based on colour reference data in the image data;

obtaining facial image data in the corrected image data, wherein the facial image data represents a face of a user;

selecting image data corresponding to a plurality of regions of skin from the facial image data to obtain facial region data, wherein the facial region data comprises a plurality of pixels, each pixel having a colour value;

analysing the pixel colour values in the facial region data to identify a plurality of facial colour values representative of the pixel colour values of the facial region data;

weighting the facial colour values according to the number of pixels whose colour value correspond to each facial colour value in the facial region data; and generating a user skin tone profile from the facial region data, wherein the user skin tone profile comprises a set of the weighted facial colour values;

selecting at least one foundation product from a foundation database, wherein the foundation database is a k-dimensional tree database comprising identifying information and colour information for each of a plurality of foundation products, wherein the selecting comprises, for each facial colour value of the user skin tone profile, performing a nearest neighbour search of the colour information in the database to identify a subset of foundation products, determining a value for a colour difference metric for each foundation product of the subset from the facial colour value, and deriving a score for each foundation product of the subset wherein the score is a function of the weight for that facial colour value and the determined value for the colour difference metric, for each foundation product, accumulating any score from the facial colour values of the user skin tone profile, and providing the identification information of the foundation product with the best score.

2. A method as claimed in claim 1 wherein the facial colour values, pixel colour values, and foundation product colour information are CIELAB values.

3. A method as claimed in claim 2 wherein analysing the pixel colour values comprises using a clustering algorithm adapted to output a set of centroids, and using the centroids as the facial colour values.

4. A method as claimed in claim 3 wherein the clustering comprises carrying out a mean shift operation on the a*b* values of CIELAB pixel colour values and recording the average L value for each a*b* value.

5. A method as claimed in claim 2 wherein the nearest neighbour search uses Euclidean distance based on the CIELAB values.

6. A method as claimed in claim 1 wherein weighting the facial colour values comprises analysing the pixel colour values of a subset of pixels in the facial region data, assessing their similarity to the facial colour values, and weighting the facial colour values according to the number of pixel colour values corresponding to each facial colour value in the subset of pixels.

7. A method as claimed in claim 6 wherein the subset is a random selection of pixels from the facial region data.

8. A method as claimed in claim 6 wherein assessing the similarity comprises using a colour difference metric.

9. A method as claimed in claim 8 wherein the colour difference metric is $\Delta E^*_{00}$.

10. A method as claimed in claim 9 wherein deriving the score for each foundation product comprises dividing the weight for the facial colour value by a function of the $\Delta E^*_{00}$.

11. A non-transitory computer readable medium comprising computer readable instructions that, when executed by a processor, cause performance of the method of claim 1.

12. An electronic device for recommending a foundation product, comprising:

an input configured to receive image data, wherein the image data comprises facial image data that represents a face of a user;

a processor; and a memory storing computer executable instructions therein which, when executed by the processor, cause the processor to:

correct a colour balance of the image data to obtain corrected image data, wherein the correction is based on colour reference data in the image data;

obtain facial image data in the corrected image data, wherein the facial image data represents a face of a user;

select image data corresponding to a plurality of regions of skin from the facial image data to obtain facial region data, wherein the facial region data comprises a plurality of pixels, each pixel having a colour value;

analyse pixel colour values in the facial region data to identify a plurality of facial colour values representative of the pixel colour values of the facial region data;

weight the facial colour values according to the number of pixels whose colour value correspond to each facial colour value in the facial region data;

generate a user skin tone profile from the facial region data, wherein the user skin tone profile comprises a set of the weighted facial colour values select at least one foundation product from a foundation database, wherein the foundation database comprises identifying information and colour information for each of a plurality of foundation products, wherein the instructions to select comprise instructions to:

for each facial colour value of the user skin tone profile, perform a nearest neighbour search of the colour information in the database to identify a subset of foundation products, determine a value for a colour difference metric for each of the subset from the facial colour value, and derive a score for each foundation product wherein the score is a function of the weight for that facial colour value and the determined value for the colour difference metric, for each foundation product, accumulate the scores from each of the facial colour values of the user skin tone profile, and provide the identification information of the foundation product with the best score.

13. An electronic device as claimed in claim 12 wherein the facial colour values, pixel colour values, and foundation product colour information are CIELAB values.

14. An electronic device as claimed in claim 13 wherein the processor is configured to carry out a mean shift clustering operation on the a*b* values of CIELAB pixel colour values and record the average L value for each a*b* value to provide the clustering.

15. An electronic device as claimed in claim 13 wherein the processor is configured to weight the facial colour values by analysing the pixel colour values of a subset of pixels in the facial region data, assessing their similarity to the facial colour values, and weighting the facial colour values according to the number of pixel colour values corresponding to each facial colour value in the subset of pixels.

16. An electronic device as claimed in claim 15 wherein the subset is a random selection of pixels from the facial region data.

17. An electronic device as claimed in claim 16 wherein the processor is configured to assess the similarity using a colour difference metric.

18. An electronic device as claimed in claim 17 wherein the colour difference metric is $\Delta E^*_{00}$.

19. An electronic device as claimed in claim 18 wherein the processor is configured to calculate a score for each foundation product by dividing the weight for the facial colour value by a function of the $\Delta E^*_{00}$.

20. An electronic device as claimed in claim 19 wherein the function of the $\Delta E^*_{00}$ is the $\Delta E^*_{00}$ plus a constant.

* * * * *